Oct. 15, 1957 R. ANNEN 2,809,527
UNIVERSAL GYROSCOPE
Filed Oct. 17, 1955 5 Sheets-Sheet 1

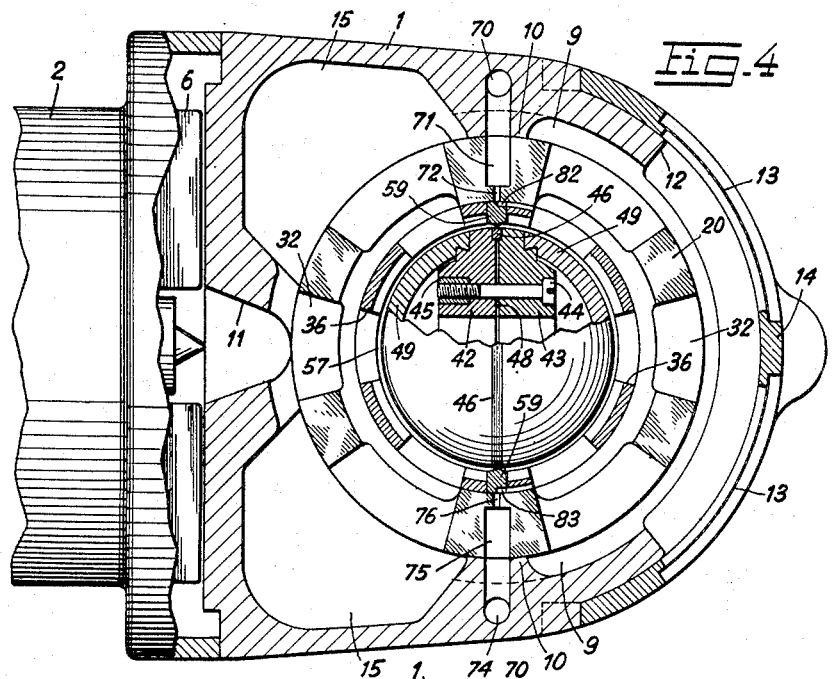
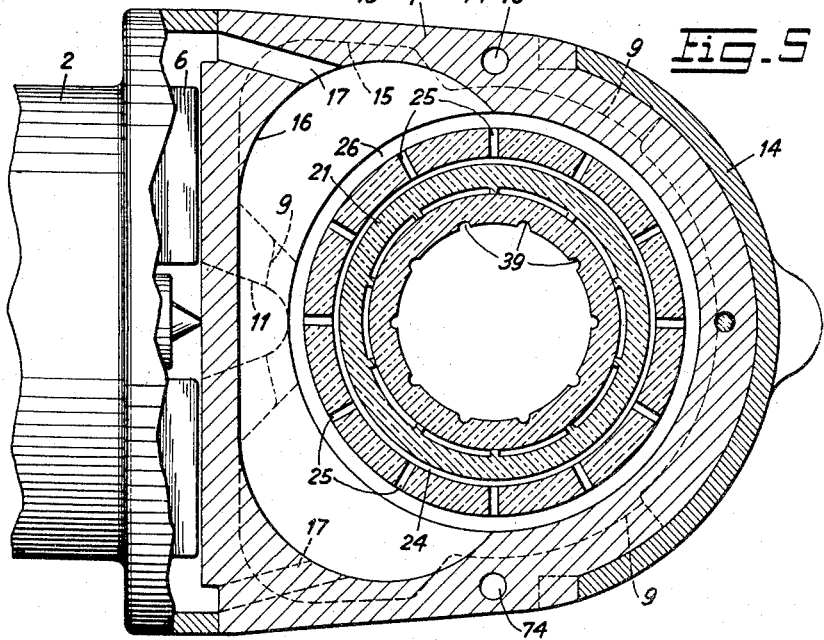

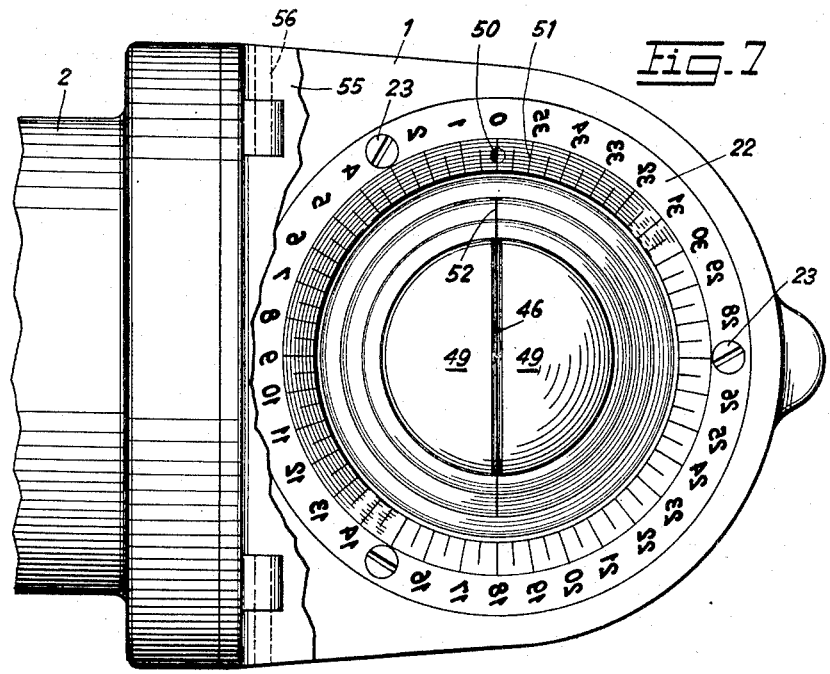
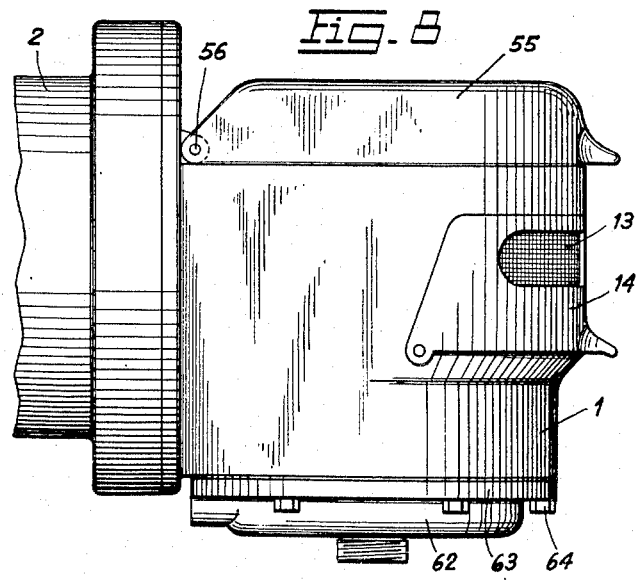

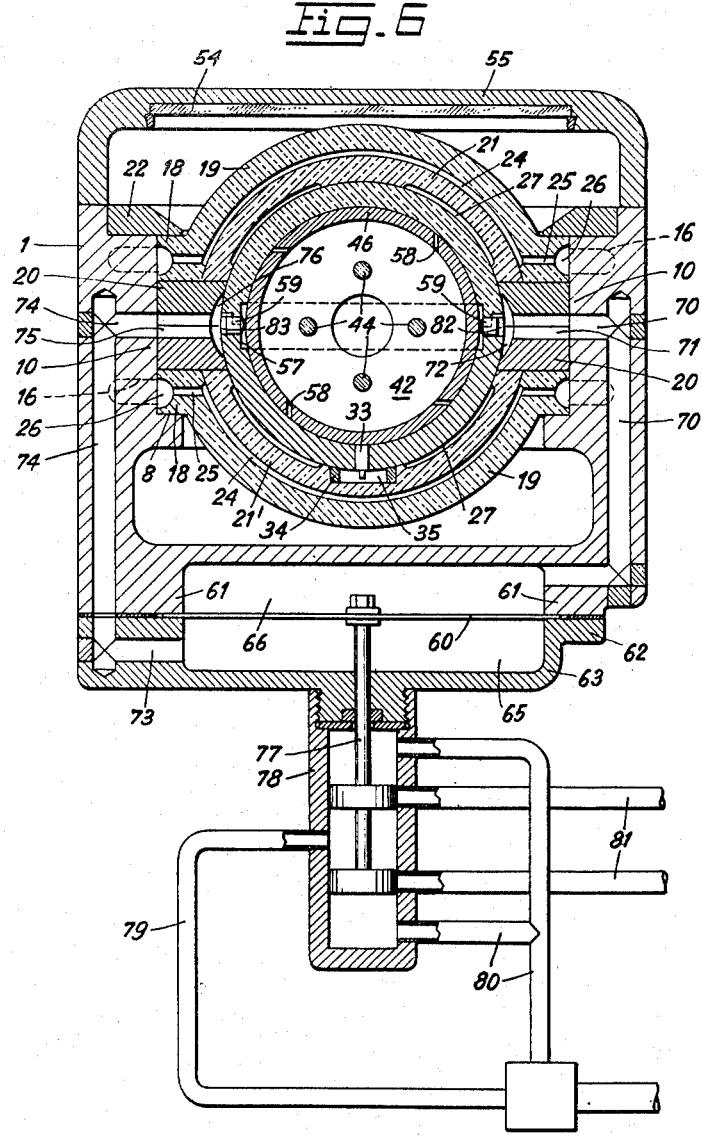

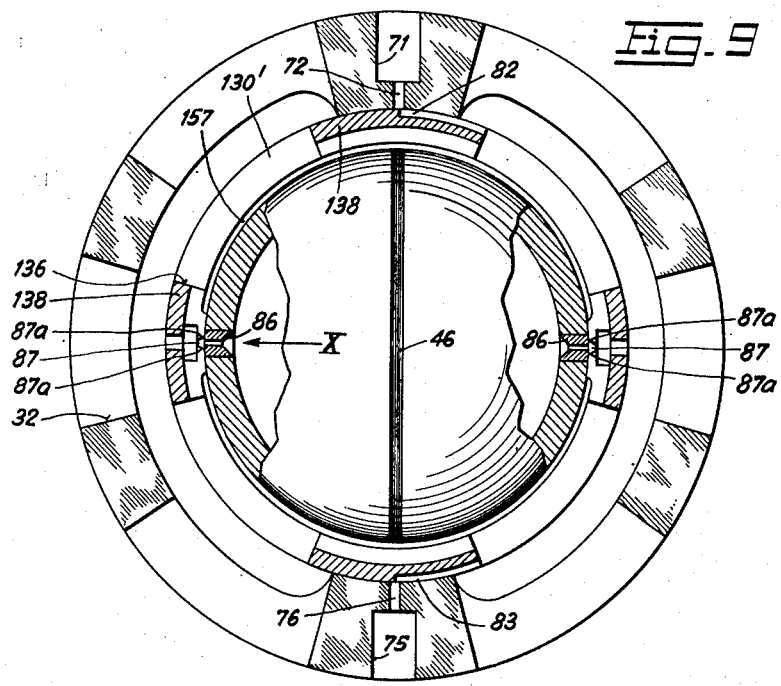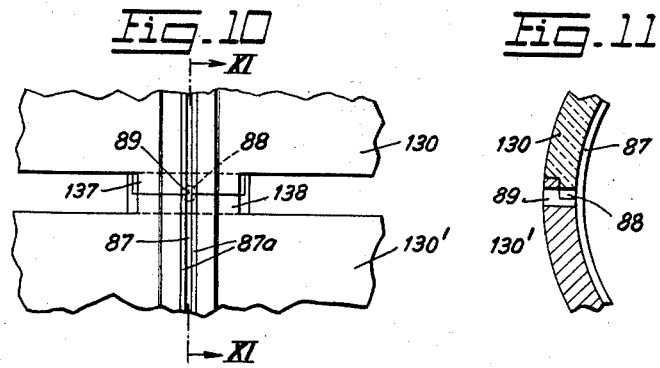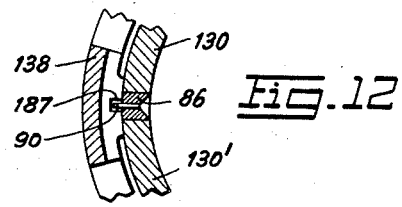

United States Patent Office 2,809,527
Patented Oct. 15, 1957

2,809,527
UNIVERSAL GYROSCOPE

Robert Annen, Bienne, Switzerland

Application October 17, 1955, Serial No. 540,997

Claims priority, application Switzerland March 2, 1955

7 Claims. (Cl. 74—5.7)

My present invention relates generally to universal gyroscopes, i. e. gyroscopic apparatus which constitute both an "artificial horizon" and a directional gyroscope; it relates more particularly to gyroscopes of this type comprising a ball-like rotor bolstered and propelled by a fluid, e. g. by air.

In the course of numerous systematic tests carried out with gyroscopes of this type, in which the rotor rotated in a fluid bearing fixed to the gyroscope casing and principally constituted by two juxtaposed caps between which is provided annular space for collecting the air which has served for bolstering and propelling the gyrostat, it was found that two influences bias the gyrostat and modify its position. The first of these influences acts so that the spin axis moves very slowly into a position in which it is at right angles to the axis passing through the peaks of the two bearing caps. The second of said influences acts so that the spin axis is constantly orientated in the same direction with respect to the bearing. It is in this preferred orientation that the rotor picks up its maximum speed.

These influences advantageously are turned into account in the gyroscope according to my present invention, which is characterized in that it comprises a bearing of which an upper portion is transparent and which is fixed to a casing of the gyroscope; a floating bearing composed of two juxtaposed hemispherical caps of which the center of gravity is situated on the common axis of the two caps and is shifted with respect to the center of the sphere defined by the caps, such floating bearing being supported by said fluid in said fixed bearing so as to be angularly movable in any direction with respect to the latter from a determined position in which the center of gravity of the floating bearing is positioned vertically below the common center of the rotor and of the floating bearing; means for limiting the angular shift of the floating bearing with respect to the fixed bearing from said determined position in any and all directions; means for binding the floating bearing to the spin axis of the rotor by nevertheless permitting the former to move freely with respect to said spin axis by pivoting about an axis which is at right angles to the latter and also to the common axis of the two caps of the floating bearing and which passes through the common geometrical center of the rotor and of the floating bearing; a mark on the rotor's equator visible through the upper transparent portion of the fixed bearing and the upper transparent cap of the floating bearing; and indicating means carried by the casing, the movements of said latter means with respect to the equator of the rotor indicating the variations of the position of the casing with respect to the spin axis of the rotor.

In this improved gyroscope the above-mentioned effects do not exercise any disturbing action on the position of the spin axis of the rotor. To such end it suffices to put the floating bearing in its "preferred" position with respect to the spin axis and to subject the floating bearing in this position to the spin axis of the rotor.

The whirling currents of air produced in the ducts which supply air from the fixed bearing to the floating bearings may be neutralized by modifying the flow sections of said ducts.

As the floating bearing may move by a certain angle in any direction with respect to the fixed bearing, the slight transversal and longitudinal balancing movements effected by the airplane in flight do not bias the position of the spin axis of the rotor. When, however, the airplane makes a flight during which its terrestrial latitude changes, gravity acts on the floating bearing of which the center of gravity is situated below its geometrical center, and the vertical axis of said bearing constantly coincides with the vertical of the point of flight, and the spin axis of the rotor thus remains perpendicular to said vertical, which is a great advantage of this gyroscope.

In acrobatic flight, the floating bearing is carried away more or less, but the resulting disturbing action is practically negligible on account of the rapidity and short duration of the airplane's movements.

One form of my present invention and two modifications of a detail thereof are illustrated in the accompanying drawings, in which:

Fig. 4 is a horizontal section on the line IV—IV of Fig. 1;

Fig. 5 is a horizontal section on the line V—V of Fig. 1, the rotor having been removed;

Fig. 6 shows in its upper portion a transverse section on the line VI—VI of Fig. 1 and, in its lower portion, a schematical illustration of a portion, known per se, of a control device of the automatic pilot of the airplane;

Fig. 7 is a top plan view of the gyroscope, the mirror-carrying cover having been omitted;

Fig. 8 shows an elevation of the gyroscope on a smaller scale than Figs. 1 and 4 to 6;

Fig. 9 is a partial horizontal section substantially on the line IV—IV of Fig. 1 and showing a modification of certain means for binding the floating bearing to the spin axis of the rotor;

Fig. 10 shows said modification in a partial view on the interior of the floating bearing in the direction of arrow X of Fig. 9;

Fig. 11 is a partial vertical section on the line XI—XI of Fig. 10; and

Fig. 12 is a partial horizontal section similar to Fig. 9 of a second modification of the means mentioned in connection with Fig. 9.

Figure 1:
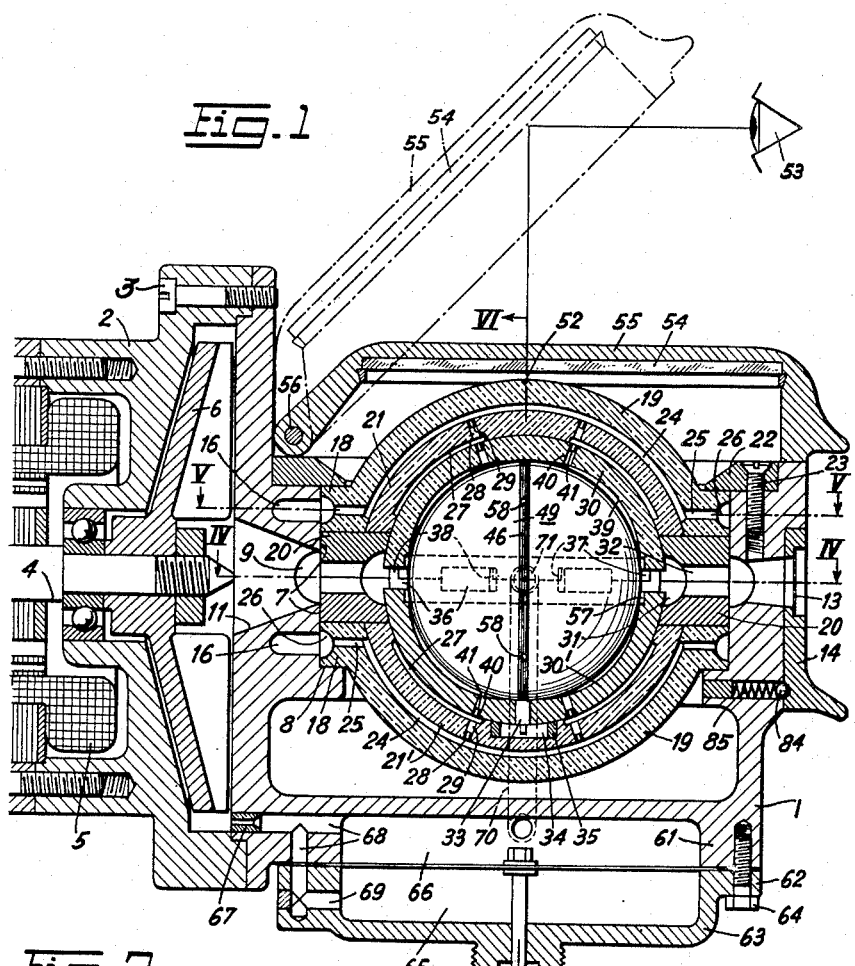
Fig. 1 is a vertical longitudinal section of the gyroscope, a hinged cover provided with an internal mirror being shown by dash-and-dot lines in its position of use, raised at 45°, and the rotor is not shown in section.
Figures 2, 3:
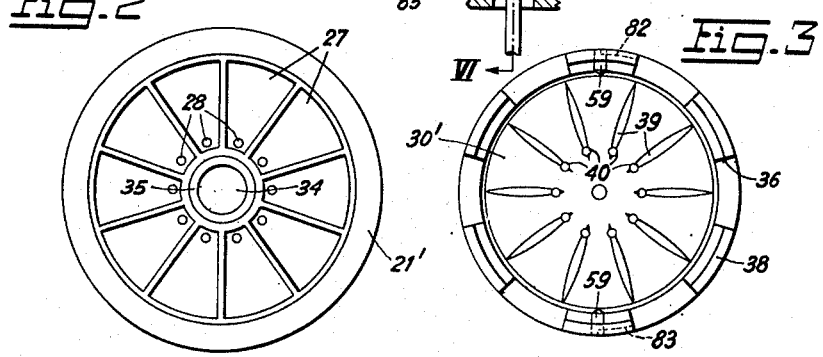
Fig. 2 depicts a bottom plan view of the lower bush of the fixed gyroscope bearing in a smaller scale than Fig. 1.
Fig. 3 shows, in the same scale as Fig. 2, a bottom plan view of the lower cap of the floating bearing.

The gyroscope shown in Figs. 1 to 8 comprises a box or casing 1 and casing 2 of a turbo-compressor, which, by means of bolts 3, is tightly fixed to a plane vertical portion of the sidewall of box 1. In casing 2 is rotatably mounted the shaft 4 of an electric motor 5, which serves to rotate an impeller 6 of the turbo-compressor.

In box 1 is provided a central vertical bore 7 of which the lower end adjoins a horizontal annular shoulder 8. At half the height of said bore is provided a peripheral groove 9 which is constricted, but not interrupted, by two projections 10 (Fig. 4). Groove 9 communicates with the central portion of turbo-compressor 2 to 6 through a bore 11, and with the atmosphere through a duct 12 (Fig. 4) in box 1. Duct 12 is covered on the outside by two filters or sieves 13 attached to a hood 14 which is pivoted to the box and serves for a purpose described later. Splays 15 are provided solely for lightening the box 1. Two further splays 16 of which one is situated above and the other below groove 9 and duct 11, are connected through holes 17 respectively, to the peripheral portion of the interior of compressor casing 2 and receive the air compressed by impeller 6.

On annular shoulder 8 is supported, by a circumferential flange 18, one of two cap-shaped covers 19 which are parts of a fixed bearing. The latter further comprises two rings 20 and two cap-shaped bushings 21, 21'. The two covers 19 and the two rings 20 interposed between the cover flanges 18 are adjusted in bore 7 and held in place by a ring 22 fixed to box 1 by three bolts 23. Each of the two bushings 21, 21' is supported on one of the two rings 20 and set and centered in the flange of the respective cover 19. In each cover-and-bushing assembly is formed a cap-like recess 24 which is connected to the corresponding splay 16 through a plurality of radial holes 25 and an exterior peripheral groove 26 in each flange 18. Each of the bearing-bushings 21, 21' on its inside surface is provided with a plurality of recesses 27 (Fig. 2) of which the depth, greatly exaggerated in Figs. 1 and 5, is approximately 0.004 inch, the diameter of the interior spherical surface being, for example 1$\frac{11}{16}$ inch. Each of the recesses 27 at its extremity adjacent the common axis of the two bearing bushings, is connected to one of the air-distributing spaces 24 through a hole 28 which is provided with a nozzle 29. The bushings 21, 21' and the two rings 20 cooperate together to support, by means of compressed air, under a pressure of approximately 18.5 pounds per square inch which is engulfed in the recesses 27, a floating bearing formed by two hemispherical caps 30, 30'. The bolstering air is collected in two grooves 31 provided in the interior spherical surface of the rings 20, and thence escapes through radial ducts 32 provided in the reciprocal contact surfaces of the rings 20, and flows through groove 9 and duct 11 towards the turbo-compressor. The lower cap 30' is made of metal, and the upper cap 30 is made of transparent material, such as polystyrene, just like the two bushings 21, 21' and the covers 19 of the fixed bearing. The lower bushing 21' and the lower cover 19 may be made of metal. The lower cap 30' is made of metal since the center of gravity of the floating bearing must be situated below the geometrical center of the hollow sphere forming the floating bearing, in the vertical of the terrestrial point over which the airplane is flying. Bushing 30' in its center is provided with a pin 33 of which the head projects into a recess 34 in the central portion of lower bushing 21', and this recess is lined by an elastic ring 35. Pin 33 is anchored in the floating bearing and together with ring 35 forms means for limiting the angle through which the floating bearing may move in any direction with respect to the fixed bearing.

Said latter means are necessary, since radial ducts 36 through which air escapes from a groove 57 (Fig. 1) in the interior of the floating bearing, must always remain open on the portions of groove 31. The ducts 36 are disposed between pairs of heels 37, 38 by means of which the two caps 30, 30' adjust themselves in each other.

The floating bearing 30, 30' serves for supporting a ball-like rotor by means of compressed air which flows from the chambers 27 into grooves 39 provided in a number equal to that of the chambers in the interior surface of each of the two caps 30, 30', through a hole 40 in the extremity adjacent the common axis of the two caps, of each groove 39. Each of said holes 40 is provided with a nozzle 41 of which the outlet is smaller than that of the nozzles 29.

The rotor comprises two coaxial juxtaposed rings 42, 43 (Fig. 4) which are pressed against an equatorial ring 46 by means of four screws 44 and four threaded sockets 45, an empty space 48 being left between the two rings 42, 43, and further by means of two similar caps 49 which are fixed by tooth and notch on the rings 42 and 43 respectively. The exterior peripheral surface of ring 46 is blackened by oxidation to mark the equator of the rotor. The exterior surfaces of the two caps 49 are colored in different colors, for example in red and blue, which again are found in the two half portions of a circle 50 marked on the upwardly exposed surface of ring 22. Said surface also is provided with a circular graduation 51, the whole in such an arrangement that the gyroscope may be "read off" like the known gyroscopes, in particular the lateral deviations. Cipher "15," for example, indicates 150° lateral deviation. "The horizon" may be ascertained by comparing "the equator" marked by the black surface of ring 46, with an index 52 marked on the exterior surface of upper bushing 21. These readings are possible by virtue of the transparency of the upper cover 19, the upper bushing 21 and of the upper cap 30. Such readings are facilitated for the pilot, whose eye is symbolized by 53 in Fig. 1, by a mirror 54 fixed to the inside of a cover 55 which is pivoted on an anxle pin 56 to box 1 and which is raised at 45° and maintained in such position by means not shown.

In the median plane of the rotor's equatorial ring 46 are provided four holes 58 which are separated from each other by 90° and which are inclined at 45°, which in some sort constitute bladings into which acts a portion of the compressed air which passes through the holes 40 of the floating bearing 30, 30' to give the rotor a rotational speed of more than 10,000 R. P. M. The air which is trapped in each of the holes 58 escapes therefrom when said hole passes in front of groove 57. The bolstering and propelling air of the rotor provokes probably also the effect mentioned in the introductory part of the description, through which the spin axis of the rotor, which obviously is the common axis of the parts 42, 43, 46 and 49, moves gradually into the equatorial plane of the floating bearing 30/30', which plane in Fig. 1 is indicated by the line IV—IV and which is horizontal in normal flight, i. e. at right angles to the vertical of the plane.

To eliminate an influence of lateral deviations and, thus, movements of the casing and of the fixed bearing about the vertical axis, into the rotor, and also for the purpose of utilizing the gyroscope for automatic piloting in the manner described above, the gyroscope comprises means which bind the floating bearing to the spin axis of the rotor, by permitting the same nevertheless to move freely with respect to said axis by rotating about an axis which stands at right angles thereto and also at right angles to the common axis of the two caps, and said axis passing through the common geometrical center of the rotor and of the floating bearing. In the form of invention shown in Figs. 1 to 8, said means comprise on the one hand the equatorial ring 46 of the rotor, which is made of mild iron, and on the other hand two permanent magnets 59 which are sunk into two diametrically opposite heels of the six heels 38 of the lower cap 30' of the floating bearing. The axes of these magnets 59 coincide with the transversal axis which stands at right angles to the common axis of the two caps and passes through the center of the floating bearing. The juxtaposed extremities of said magnets are slightly conical. The magnetic attraction which the magnets exert on ring 46, which functions as armature, causes the floating bearing to be bound to the spin axis in the manner indicated above.

To understand the dispositions relative to automatic piloting, it has to be noted that, when flying in the desired direction, the movable portions occupy the positions shown in Figs. 1 and 4 to 8.

An elastic membrane 60 is edgewise clamped by means of screws 64 between a flange 61 provided on the lower side of box 1, and a flange 62 of a lid 63. The interior spaces 65, 66 situated on both sides of membrane 60 are fed with compressed air from turbo-compressor 2, 6 through a nozzle 67 and ducts 68, 69. Space 66, moreover, is connected through ducts 70 of box 1 and a duct 71 formed between the rings 20, to a narrow slot 72 provided in said rings. Space 65 communicates, in a similar manner, through ducts 73 to 75 with a slot 76 which is diametrically opposite to slot 72. To the center of membrane 60 is fixed a stem 77 of the movable element of a slide valve of a known hydraulic control device. The latter comprises a cylinder 78, a line 79 which supplies oil from a pump, return pipes 80, and pipes 81 which connect the valve to a servo-motor (not shown) of the rudder mechanism of the airplane. Each of the orifices 72, 76 cooperates with a groove 82 and 83 respectively, of the floating bearing, in the manner of a valve. In the form of invention shown, the exterior ends of the magnets each comprises a semicircular recess which is a part of said groove 82 or 83. The orifices 72, 76 are of sufficient height so that the function will not be influenced by angular movements of the fixed bearing with respect to the floating bearing in the plane of Fig. 6. When, however, the airplane undergoes, for example, a lateral deviation which appears as clockwise angular movement of casing 1 in the plane of Fig. 4, together with the rings 20 of the fixed bearing and with the orifices 72 and 76, relatively to the floating bearing 30, 30' which is bound to the spin axis of the rotor which does not move, then the compressed air continues to flow through the valve 72, 82 but no longer through the valve 76, 83. The compressed air thus does not accumulate in space 66 which communicates with the open valve 72, 82. On the contrary, the compressed air will accumulate in space 65 which communicates with the closed valve 76, 83. For this reason, the membrane 60 which is subjected to the intervening differential pressure, raises the movable element 77 of the control valve of the rudder servomotor which is then moved, as known in the art, to reset the airplane into the desired flight direction. In the case of a lateral deviation in the opposite sense, the function is similar, but the valve 76, 83 then remains open, whereas the valve 72, 82 is closed, and the membrane lowers the element 77.

The air flowing through the open valve is mixed with the bolster air in groove 31. It thus circulates, just like said air bolstering and propelling the rotor, in a closed circuit.

It is noted here that the box with membrane 60 could constitute an assembly separated from casing 1, in which case the ducts 68 to 70 and 74 would be replaced by pipes. In the hydraulic control device which is described below, only the valves 72, 82 and 76, 83 which partly are formed in the fixed bearing and partly in the floating bearing, constitute a new feature.

In order to put the gyroscope in operation, the pilot engages a switch disposed in the supply circuit of the electric motor 5. Turbo-compressor 2, 6 then delivers compressed air which serves for bolstering the floating bearing, bolstering and propelling the rotor and for controlling the automatic pilot. As soon as the rotor spins at its normal speed after approximately two minutes, hood 14 is lowered, it normally being retained in the position shown by a spring-loaded ball 84, 85. The pilot then moves a soft-wood peg across the opening 12 of casing 1, one of the openings 32 of the fixed bearing and one of the openings 36 of the floating bearing against the rotor. One of the rotor poles moves automatically in juxtaposition with the peg tip which is slightly pressed on the rotor. The spin axis of the rotor thus may be given the desired orientation either on departure or at any time during the flght.

Opening 12 is sufficiently large to permit orientation of the spin axis so that the peg may be removed and reintroduced in a direction different by 90° and to press it into the equatorial ring 46 in order to slow down the rotor which should be brought to stop before cutting the supply of current of motor 5.

In the case where the spin axis of the rotor is bound to the floating bearing by means of pins, it suffices to slowly turn the floating bearing horizontally by acting on one of the heels 38 in order to give said spin axis the desired direction.

When the airplane flies horizontally, mark 52 is superimposed on the black band of the exterior surface of the equatorial ring 46 of the rotor. When the airplane descends, mark 52 moves to the left in Fig. 1. In mirror 54 which moves with said mark, the image of equatorial circle 46 is then an elliptical arc positioned above the image of mark 52 which is always a straight mark. For the pilot, the horizon rises.

For reading-off the lateral deviations of the airplane, the pilot compares the position of the equatorial circle 46 with the circular graduated scale 51 and also the colors of the two caps 49 with the colors in the half-portions of circle 50. If such latter comparison could not be made, the pilot would risk to fly in the direction opposite to the desired direction.

The swaying movements of the order of plus or minus 5° which a plane makes in normal flight, do not bias the rotor in any way, as the fixed bearing may move through such angles with respect to the floating bearing without ring 35 touching the projecting head of pin 33.

The gyroscope described above may be modified, aside from the modifications already mentioned with respect to the control device for the automatic pilot, without leaving the frame of the invention.

In the following lines are described two modifications of the means for binding the floating bearing to the spin axis of the rotor.

The first of these two modifications is illustrated in Figs. 9 to 11. Fig. 9 shows only one of the rings 20 of the non-modified fixed bearing as well as the floating bearing and rotor which are slightly modified as follows. The permanent magnets 59 have been omitted. A jet nozzle 86 inserted in a bore in the center of each rotor cap 149 blows a portion of the propelling air, which has entered the rotor through the holes 58, against the diverging sidewalls 87a of a groove 87 provided in a vertical plane on the entire circumference of the interior surface of the floating bearing 130, 130' of which the heels 137, 138 and the covers 136 are somewhat differently distributed, and of which the groove 157 is subdivided into two portions so as not to intersect groove 87. The air blown into the latter escapes therefrom by passing through the slot 88 and the hole 89 and is mixed in groove 31 with the air which has bolstered the movable bearing.

The second modification, shown in Fig. 12, is more simple than the first, although it differs only slightly therefrom. In the hole of each of the elements 86, which here no longer act as nozzles, is set a cylindrical pin 90 which projects with play into a groove 187 which differs from groove 87 only by the fact that its sidewalls are parallel to each other.

It will readily be appreciated that in these two modifications the floating bearing also is bound to the spin axis of the rotor, but nevertheless may move freely with respect thereto by pivoting about an axis which is perpendicular thereto and also perpendicular to the common axis of the two caps forming the floating bearing, and such latter axis passes through the common geometrical center of the floating bearing and of the rotor.

While different embodiments of the invention have been shown and described, various changes in the shape, size and arrangement of parts could obviously be resorted to without departing from the spirit of the invention or the scope of the subjoined claims.

I claim:

1. A universal gyroscope comprising a ball-like rotor supported and propelled by a fluid; a bearing of which an upper portion is transparent and which is fixed to a casing of the gyroscope; a floating bearing composed of two juxtaposed hemispherical caps of which the center of gravity is situated on the common axis of the two caps and is shifted with respect to the center of the sphere defined by the caps, such floating bearing being supported by said fluid in said fixed bearing so as to be angularly movable in any direction with respect to the latter from a determined position in which the center of gravity of the floating bearing is positioned vertically below the common center of the rotor and of the floating bearing; means for limiting the angular shift of the floating bearing with respect to the fixed bearing from said determined position in any and all directions; means for binding the floating bearing to the spin axis of the rotor by nevertheless permitting the former to move freely with respect to said spin axis by pivoting about an axis which is at right angles to the latter and also to the common axis of the two caps of the floating bearing and which passes through the common geometrical center of the rotor and of the floating bearing; a mark on the rotor's equator visible through the upper transparent portion of the fixed bearing and the upper transparent cap of the floating bearing; and indicating means carried by the casing, the movements of said latter means with respect to the equator of the rotor indicating the variations of the position of the casing with respect to the spin axis of the rotor.

2. A gyroscope as set out in claim 1, in which the means for binding the floating bearing to the spin axis of the rotor comprise an equatorial ring of soft iron which is part of the rotor, and two diametrically opposite permanent magnets situated on said perpendicular axis and countersunk in the floating bearing.

3. A gyroscope as set out in claim 1, in which the means for binding the floating bearing to the spin axis of the rotor comprise a nozzle for injecting fluid from the interior to the exterior of the rotor at a pole of the latter, and a meridian groove on the interior surface of the floating bearing, said groove having divergent sidewalls and communicating with a fluid outlet aperture into which the fluid is blown through said nozzle.

4. A gyroscope as set out in claim 1, in which said means for binding the floating bearing to the spin axis of the rotor comprise a pin which projects from the rotor at least from one of its poles, and a meridian groove on the interior surface of the floating bearing, into which groove said pin fits with play.

5. A gyroscope as set out in claim 1, in which said limiting means include a pin anchored in the lower cap of the floating bearing in the common axis of the two caps of the latter, this pin protruding into a circular recess provided in the inner surface of the fixed bearing.

6. A gyroscope as set out in claim 1, in which the fixed bearing comprises two superimposed rings, two bearing bushings in the form of spherical caps of which each is supported on one of said rings, two covers also generally of spherical cap form and provided with cylindrical flanges on their exterior sides where the diameter is equal to that of the two rings and of a bore in the casing in which said covers and rings are fitted, a hollow space in form of a spherical cap formed between each assembly of cover and bearing bushing fitted in the latter, said space being connected to a source of pressurized fluid through radial ducts and a peripheral groove formed in the cover flange and through passages formed in the casing a plurality of circularly arranged recesses which form fluid chambers provided on the interior surface of each bearing bushing, each of said chambers at its extremity adjacent to the axis of the bushing communicating with said hollow space through a hole fitted with a nozzle, a plurality of further circularly arranged recesses extending along meridian lines in the lower surface of each bushing of the floating bearing, each of said further recesses at its extremity adjacent to the bushing peak communicating with one of said fluid chambers through a hole provided with a nozzle and having a discharge cross-section which is smaller than that of the nozzles of the bushings of the fixed bearing, and a plurality of ducts partly peripheral and partly radial in the caps of the floating bearing and of the two superimposed rings of the fixed bearing at points where said caps and rings touch each other, said latter ducts serving to receive and discharge through ducts provided in the casing fluid which has served for bolstering the floating bearing and the rotor and for propelling the latter.

7. A gyroscope as set out in claim 1, including a hydraulic control device for the automatic pilot of an airplane in which the gyroscope is mounted, in which said hydraulic device comprises a pair of control slide valves with a pair of diametrically opposite orifices provided in the fixed bearing along a transversal axis which coincides with said axis perpendicular to the spin axis of the rotor when the airplane flies in the desired direction, and a pair of grooves machined along the diametral reciprocal contact plane of the two bushings of the floating bearing in the latter's exterior surface on a side of a vertical plane passing through said axis perpendicularly to the axis of gyration of the gyrostat.

References Cited in the file of this patent

UNITED STATES PATENTS

| | | |
|---|---|---|
| 1,864,801 | Chaplin | June 28, 1932 |
| 1,954,998 | Hoffmann | Apr. 17, 1934 |
| 2,688,805 | Annen | Sept. 14, 1954 |